Patented Sept. 14, 1937

2,092,999

UNITED STATES PATENT OFFICE 2,092,999

POLYMERIZATION OF RESINS

George Kenneth Anderson, Pittsburgh, and William D. Johnston, Jr., Dormont, Pa., assignors to The Neville Company, a corporation of Pennsylvania No Drawing. Application February 17, 1936, Serial No. 64,341

10 Claims. (Cl. 260—7)

This invention, constituting improvement upon the disclosure of certain applications for letters patent of the United States Serial No. 751,708, filed November 6, 1934, now Patent No. 2,047,246, granted July 14, 1936, and Serial No. 29,376, filed July 1, 1935, now Patent No. 2,047,247, granted July 14, 1936, relates primarily to a method of producing a catalyst capable of promoting a resin-forming polymerization. More particularly considered, it relates to a method of so reacting sulphuric acid with an ether as effectively to use an increased proportion of the ether, and to increase the stability of the catalyst produced.

In the procedure of the applications above noted sulphuric acid is commingled with an appropriate ether, the proportions, in accordance with the procedure of those applications, being desirably such as to give a substantial excess of ether over sulphuric acid. By our procedure we are able to effect economy in the quantity of ether used by bringing an increased percentage of the ether into combination with the sulphuric acid; and, by so doing, also produce a catalyst of increased stability.

As is well known, resins of the type commonly known as "coumarone" resins are formed by effecting catalytic polymerization of the polymerizable reactives in crude solvent naphthas, and the like equivalent liquids. In conformity with the polymerization characteristics of crude solvent naphthas in which polymerization is conducted by means of sulphuric acid as a catalyst, relatively strict temperature control conditions, or conditions rendering the acid gradually effective, must be established in order that temperature surge be prevented and high grade resin be obtained.

In conducting our method of making a polymerization catalyst for the noted purpose, we use, to produce with the sulphuric acid a catalyst of modified qualities, saturated aliphatic ethers, responding to the type formula R—O—R', in which type formula "R" and "R'" are each an alkyl group, and "O", as is usual, represents oxygen. We prefer to use the ethers of this type beginning with diethyl ether and extending through diamyl ether in a progressive molecular weight table of the saturated aliphatic ethers. Within the preferred class of ethers, particularly isopropyl ether and diethyl ether have proven to be both effective chemically and expedient commercially.

It has been above noted that in previous practice ether in substantial excess has been commingled with the sulphuric acid. In such previous practice the best results have been obtained by adding ether sufficient to give a 4 to 1 ratio with 66° Baumé sulphuric acid. As so commingled there is a reaction producing alkyl sulphuric acid. From the percentage of ether recoverable as such, however, it appears that the maximum formation of alkyl-sulphuric acid as a stable compound is not approximated. The catalysts so prepared must be used quickly, because they lose their efficiency with relatively great rapidity. They are good catalysts for promoting the resin-forming polymerization in crude solvent naphthas.

Generally stated, we have found that upon commingling the sulphuric acid and the ether in such proportions that the sulphuric acid is included in excess of equimolecular proportions of the acid and the ether, we obtain, under the influence of gentle heating, a catalyst in which the ether has to an increased extent been reacted with the sulphuric acid to form a stable compound therewith. By "equimolecular proportions" we mean 1 mol. of sulphuric acid to 1 mol. of ether. In procedure, the sulphuric acid and ether are commingled at normal room temperature, or lower temperature, and the mixture is subjected for a substantial time period to heat treatment at a temperature sufficiently high to promote reaction between the sulphuric acid and the ether, but not sufficiently high to emphasize the destructive oxidizing tendencies of the acid.

We have also found that, under the influence of gentle heating, progressive increase in the excess of sulphuric acid up to a ratio of 1 mol. of sulphuric acid to ½ mol., or slightly less, of ether, results in proportional increase in the utilization of the ether to form a stable compound with the sulphuric acid. We may thus consider that the stated proportions of 1 mol. of sulphuric acid to ½ mol. of ether are the primarily optimum proportions. Some additional advantage, resultant from the dehydrating effect of sulphuric acid in absorbing water produced incidentally in the reaction, is obtainable by slight reduction in the ratio of ether below ½ mol. to 1 mol. of sulphuric acid. Thus we have successfully employed a ratio of 1 mol. of sulphuric acid to .493 mol. of ether.

We suggest the following theory, by which we do not intend to be concluded. Such theory, based upon the observed facts, is that when the reaction mixture is heated, the first trend of the reaction is to produce the alkyl acid sulphate and a corresponding monohydric alcohol. When sulphuric acid is present in excess of the initial combining proportion, there are, therefore, additional molecules of sulphuric acid free to combine with the monohydric alcohol additionally to form alkyl acid sulphate and water. If then the molecular excess of sulphuric acid be adequate to combine with the alcohol, substantially complete combination of the ether becomes possible, and actually takes place under gentle heating.

The above is theory. It is, however, an observed fact that gentle heating throughout a substantial time period is necessary in order that the reaction may proceed to the production of a stable alkyl acid sulphate formed by reaction of sulphuric acid with approximately the entire content of ether.

To give a specific example of procedure in accordance with our method, we have commingled sulphuric acid with diethyl ether in an approximate volumetric ratio of 1 part of 66° Baumé sulphuric acid to .88 part of diethyl ether, performing this stage of the process at a temperature held below 30° C. When the components of the mixture had been thoroughly commingled, the mixture was allowed to stand for a short time. The temperature was then gradually raised, and the mixture was maintained, under reflux conditions, at a temperature of from 68° C. to 72° C. for a period of one hour. Of the original ether included in the reaction mixture we were able to recover only about 6% unreacted.

To give another specific example, we commingled 66° Baumé sulphuric acid with isopropyl ether in the approximate volumetric ratio of 3 parts of sulphuric acid to 4 parts of isopropyl ether, holding the temperature below 30° C. during mixing. This mixture we maintained at a temperature of from 50° C. to 60° C., and under reflux conditions, for a treating period of three hours. Of the original ether included in the reaction mixture we were able to recover only about 6% unreacted.

We have found that catalyst resultant from procedure in accordance with both examples acts identically in promoting resin-forming polymerization. A typical example of the use of the catalyst is as follows:

Taking 1600 gals. of crude solvent naphtha boiling within the range of 165° C. to 195° C., and containing 50% polymerizables, we added 2% by volume of the catalyst. The starting temperature of the naphtha was 20° C., and the catalyst was added during a period of 6 minutes while agitating the naphtha. Temperature control was effected by recirculation in a tap-water cooled heat exchanger. Upon addition of the catalyst, the temperature rose during the first 11 minutes to a maximum of 23° C. During the remainder of a treating period totalling approximately six hours the temperature remained between 23° C. and 25° C., cooling throughout being effected by tap water.

After completion of the polymerizing reaction the reacted liquid was permitted to settle and the catalyst was drained off. The remaining traces of catalyst were removed by agitating the reacted liquid with 4% to 6% its weight of fuller's earth, at a temperature of from 110° C. to 120° C., followed by filtration.

It is a valuable characteristic of the alkyl-sulphuric acid catalyst that, when the polymerizing reaction is conducted with proper temperature control, deacidification of the reacted liquid may be effected by adsorption of final traces of the catalyst by clay. Under polymerization conditions commonly established when sulphuric acid is used as the polymerization-promoting catalyst clay treatment is not thus effective adequately to deacidify the reacted liquid. The use of such catalyst, therefore, avoids necessity for chemical neutralization, followed by washing. It also, therefore, avoids necessity for diluting the reacted liquid as a prerequisite for washing.

Returning to the specific example of a resin-forming polymerization effected by use of our catalyst, the reacted and purified liquid was distilled for the separate recovery of refined solvent, heavy oil comprising the lower polymers, and hard resin.

The resultant hard resin was a good grade of coumarone resin, having a melting-point of 128° C., a light yellow color, and a definite precipitation from Stoddard solvent naphtha at 14° C. Such test for solubility of resins consists in making a 20% solution of the resin, and cooling back to a temperature at which definite precipitation occurs.

We have found that an acid sulphate catalyst, prepared in accordance with our method, retains its efficiency unimpaired after a storage of several months duration.

We claim as our invention:

1. In a catalytic polymerization process producing coumarone resin from the polymerizable reactives of crude solvent naphtha, the catalytic polymerization step which comprises promoting polymerization of the said reactives by means of an alkyl-sulphuric acid catalyst which is the product of heat-promoted reaction between sulphuric acid and a saturated aliphatic ether in a ratio of sulphuric acid to ether approximating 2 mols of the acid to 1 mol. of the ether.

2. A coumarone polymerization catalyst capable of promoting resin-forming polymerization in the polymerizables of crude solvent naphtha consisting of the alkyl-sulphuric acid product of heat-promoted reaction between sulphuric acid and a saturated aliphatic ether in a ratio of sulphuric acid to ether approximating 2 mols of the acid to 1 mol. of the ether.

3. In a catalytic polymerization process producing coumarone resin from the polymerizable reactives of crude solvent naphtha, the catalytic polymerization step which comprises promoting polymerization of the said reactives by means of an alkyl-sulphuric acid catalyst which is the product of preponderantly complete heat-promoted reaction between sulphuric acid and a saturated aliphatic ether in a ratio of sulphuric acid to ether slightly in excess of 2 mols of the acid to 1 mol. of the ether.

4. A coumarone polymerization catalyst capable of promoting resin-forming polymerization in the polymerizables of crude solvent naphtha consisting of the alkyl-sulphuric acid product of preponderantly complete heat-promoted reaction between sulphuric acid and a saturated aliphatic ether in a ratio of sulphuric acid to ether slightly in excess of 2 mols of the acid to 1 mol. of the ether.

5. In a catalytic polymerization process producing coumarone resin from the polymerizable reactives of crude solvent naphtha, the catalytic polymerization step which comprises promoting polymerization of said reactives by means of an alkyl-sulfuric acid catalyst which is the product of preponderantly complete heat-promoted reaction between sulfuric acid and a saturated aliphatic ether in the proportions of more than 1 mol. of ether to from more than 1 to slightly in excess of 2 mols of acid.

6. A coumarone polymerization catalyst capable of promoting resin-forming polymerization in the polymerizables of crude solvent naphtha, consisting of alkyl-sulfuric acid product of heat-promoted reaction between sulfuric acid and a saturated aliphatic ether in which reaction the ratio of sulfuric acid to said ether is from substantially in excess of 1 mol. of acid to 1 mol. of ether, to slightly in excess of 2 mols of acid to 1 mol. of ether.

7. In a catalytic polymerization process producing coumarone resin from the polymerizable reactives of crude solvent naphtha, the catalytic polymerization step which comprises promoting polymerization of the said reactives by means of an alkyl-sulfuric acid catalyst produced by mixing, at a temperature not over about 30° C., sulfuric acid and a saturated aliphatic ether in a ratio from substantially in excess of 1 mol. of acid to 1 mol. of ether, to slightly in excess of 2 mols of acid to 1 mol. of ether, and then heating the mixture at a temperature between about 50° C. to 72° C. to effect preponderantly complete conversion of said ether to said alkyl-sulfuric acid catalyst.

8. A coumarone polymerization catalyst capable of promoting resin-forming polymerization in the polymerizables of crude solvent naphtha, consisting of the alkyl-sulfuric acid product produced by mixing, at a temperature not over about 30° C., sulfuric acid and a saturated aliphatic ether in a ratio from substantially in excess of 1 mol. of acid to 1 mol. of ether, to slightly in excess of 2 mols of acid to 1 mol. of ether, and then heating the mixture at a temperature between about 50° C. to 72° C. to effect preponderantly complete conversion of said ether to said alkyl-sulfuric acid catalyst.

9. A process according to claim 7, said ether being isopropyl ether.

10. A process according to claim 7, said ether being diethyl ether.

GEORGE KENNETH ANDERSON.
WILLIAM D. JOHNSTON, Jr.